(12) United States Patent
Calabrese et al.

(10) Patent No.: US 6,348,514 B1
(45) Date of Patent: Feb. 19, 2002

(54) STABILIZED POLYETHER POLYOL AND POLYURETHANE FOAM OBTAINED THEREFROM

(75) Inventors: Ronald A. Calabrese, Guildford; Rosemarie A. Boccuzzi, Middlebury, both of CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/486,762

(22) PCT Filed: Sep. 29, 1998

(86) PCT No.: PCT/US98/20349

§ 371 Date: Mar. 1, 2000

§ 102(e) Date: Mar. 1, 2000

(87) PCT Pub. No.: WO99/16821

PCT Pub. Date: Apr. 8, 1999

Related U.S. Application Data (60) Provisional application No. 60/060,568, filed on Sep. 30, 1997.

(51) Int. Cl.$^7$ .............................................. C08G 18/00
(52) U.S. Cl. ............. 521/130; 255/182.24; 255/182.27; 521/113; 521/117; 521/155; 521/170; 521/174

(58) Field of Search .................................. 521/155, 130, 521/113, 117, 170, 174; 252/182.24, 182.27

(56) References Cited

U.S. PATENT DOCUMENTS 5,739,377 A * 4/1998 Ohsawa et al. ............... 560/75

FOREIGN PATENT DOCUMENTS

JP 51117750 * 10/1976

* cited by examiner

Primary Examiner—John M. Cooney, Jr.
(74) Attorney, Agent, or Firm—Daniel Reitenbach (57) ABSTRACT

Disclosed is an isocyanate-reactive composition comprising an isocyanate-reactive compound having an equivalent weight of from about 400 to about 12000, and a stabilizing amount of methyl 3-(4-hydroxy-3,5-di-tert-butylphenyl) propionate with optional costabilizers selected from another phenolic, an amine, a phosphite, a thioether, or a lactone stabilizer to form a stabilizer package which may be further used in a process for preparing a flexible polyurethane foam comprising reacting together an organic polyisocyanate with an isocyanate-reactive composition in the presence of a blowing agent to form the polyurethane foam.

14 Claims, 5 Drawing Sheets

STABILIZED POLYETHER POLYOL AND POLYURETHANE FOAM OBTAINED THEREFROM

This application is a 371 of PCT/US98/20349, filed Sep. 29, 1998, which claims benefit of U.S. provisional application Ser. No. 60/060,568, filed Sep. 30, 1997.

BACKGROUND OF THE INVENTION

This invention relates to methods for stabilizing organic materials which are prone to deterioration via thermal and/or oxidative mechanisms and to the resulting stabilized materials. More particularly, the invention relates to such methods and compositions which employ methyl 3-(4-hydroxy-3,5-di-tert-butylphenyl)propionate as a stabilizer [also known in alternate nomenclature as methyl 3-(3,5-di-tert-butyl-4-hydroxyphenyl) propionate and identified herein as MBPP].

Methods for the stabilization of polyether polyols and other polymeric materials with antioxidants or other stabilizers and the use of the stabilized polyols in the preparation of polyurethane foams to inhibit scorch are well known. Polyether polyols, used in the manufacture of slabstock flexible and semiflexible polyurethane foams, are typically stabilized with antioxidant packages consisting of phenolic and amine antioxidants which may also contain synergists such as phenothiazine or various compounds containing phosphite moieties.

Polyurethane foams have been conventionally prepared by reacting a high equivalent weight isocyanate-reactive compound and a polyisocyanate in the presence of a blowing agent. Useful blowing agents include, for example, water, low boiling liquids, such as chlorofluorocarbon, methylene chloride and liquid carbon dioxide, or mixtures thereof.

A persisting problem, however, in the preparation of flexible polyurethane foams, especially in slabstock-type foams, is foam polymer degradation resulting in discoloration (herein also referred to as "scorch").

Scorch is a well-known thermo-oxidative process caused by the heat released from the exothermic reactions, especially from the exothermic reaction between water and the isocyanate. This thermo-oxidative process may be further exacerbated by the ambient heat and humidity conditions and can reach levels of self-ignition of the foam. Therefore, scorch is considered one of the most serious issues since it represents a potential fire hazard for the foam manufacturers. Scorch is normally expressed as a function of coloration of the foam which is expressed as delta E. The higher delta E, the higher the scorch of the foam.

While 2,6-di-tert-butyl-4-methyl phenol, also referred to as butylated hydroxytoluene, or BHT has been widely used for many years as a stabilizer for polymers, it is subject to several drawbacks including its relatively high volatility, its ability to sublime and its ability to form highly colored chromophores which can cause discoloration in polymers, polymer foams and materials in contact with the polymers. Accordingly, many investigations have been undertaken to modify the chemistry of BHT to eliminate or mitigate the aforementioned drawbacks or to replace BHT entirely with some other stabilizer of equivalent or superior effectiveness.

SUMMARY OF THE INVENTION

In accordance with the present invention, a process for preparing a flexible polyurethane foam comprising reacting together an organic polyisocyanate with an isocyanate-reactive composition, wherein one of the reactants has mixed therewith a stabilizing amount of methyl 3-(4-hydroxy-3,5-di-tert-butylphenyl)propionate, in the presence of a blowing agent and under conditions sufficient to form the polyurethane or polyisocyanurate foam. Also disclosed is an isocyanate-reactive composition comprising an isocyanate-reactive compound having an equivalent weight of from about 400 to about 12000, and a stabilizing amount of methyl 3-(4-hydroxy-3,5-di-tert-butylphenyl)propionate. Additionally disclosed is a method for stabilizing an organic material that is subject to thermal and/or oxidative deterioration is provided which comprises incorporating into such material a stabilizing amount of methyl 3-(4-hydroxy-3,5-di-tert-butylphenyl)propionate, optionally with another phenolic and/or an amine and/or phosphite or thioether or lactone stabilizer to form a stabilizer package for polyols, polyurethanes and other oxidatively degradeable polymeric materials.

DESCRIPTION OF THE PREFERRED EMBODIMENTS

The essential stabilizer composition of this invention is methyl 3-(4-hydroxy-3,5-di-tert-butylphenyl)propionate, made by known processes. This essential stabilizer may be supplemented with one or more suitable costabilizers and antioxidants such as those set forth in U.S. Pat. No. 5,516,920, which is incorporated by reference. The most common costabilizers are listed below with a few commonly available representative materials of the class.

In carrying out the method of the invention, a stabilizing amount of the stabilizing composition is added to an organic material which is susceptible to thermal and/or oxidative degradation. In particular, synthetic organic polymeric substances such as vinyl resins formed from the polymerization of vinyl halides or from the copolymerization of vinyl halides with unsaturated polymerizable compounds can be stabilized with the mixtures of functionalized esters of this invention. Specifically, these vinyl compounds would include vinyl esters, alpha, beta-unsaturated acids, esters, aldehydes, ketones and unsaturated hydrocarbons such as butadiene or styrene. The method of this invention is also applicable to the stabilization of poly-alpha-olefins such as polyethylene, polypropylene, polybutylene, polyisoprene, and the like and copolymers of poly-alpha-olefins, polyamides, polyesters, polycarbonates, polyacetals, polystyrene and polyethyleneoxide. Included as well are high-impact polystyrene copolymers such as those obtained by copolymerizing butadiene and styrene and those formed by copolymerizing acrylonitrile, butadiene and styrene. Other organic materials stabilized in accordance with the present invention include aliphatic ester lubricating oils, animal and vegetable-derived oils, hydrocarbon materials such as gasoline, both natural and synthetic, diesel oil, mineral oil, fuel oil, drying oil, cutting fluids, waxes, resins and fatty acids such as soaps.

A particularly advantageous application of the method of this invention is the stabilization of polyether and polyether polyols which are thereafter reacted with isocyanates to produce polyurethane and polyispcyanurate flexible and rigid foams. The stabilization compositions of this invention impart scorch (both physical and color) protection to the polyurethane foams which are employed in such end uses as carpet underlay, bedding, furniture, automobiles (both insulation and seats) and packaging. The occurrence of scorch is of major concern to polyurethane foam manufacturers since scorch negatively affects the appearance of the product, causes physical damage and can result in fire. Therefore, foam manufacturers require enhanced scorch protection during flexible slabstock foam production. The role of antioxidants can be critical in providing increased scorch protection in urethane foams without diminishing the other properties desired by the industry.

The stabilizer composition of this invention can be incorporated into the organic material to be stabilized by known and conventional methods. In particular, the stabilizer composition of this invention can be pumped or metered into the organic material in predetermined amounts. The specific amounts of stabilizer composition employed can vary widely depending upon the particular organic material being stabilized. In general, the addition of from about 0.01 to about 5, preferably from about 0.02 to about 1 and more preferably from about 0.05 to about 0.25 percent, of stabilizer composition by weight of the organic material to be stabilized provides generally good results. If a costabilizer is used, it may present in the same amount as the primary stabilizer set forth above. In the case of a polyurethane foam, such amounts of stabilizer composition can be added directly to a component of the polyurethane foam-forming composition, e.g., the polyol, or the isocyanate component or to the foam-forming composition itself.

Phenolic Costabilizer

Suitable hindered phenols that can also be utilized in the composition herein include 2,4-dimethyl-6-octylphenol, 2,6-di-t-butyl-4-methylphenol, 2,6-di-t-butyl-4-nonylphenol, 2,6-di-t-butyl-4-ethylphenol, 2,6-di-t-butyl-4-n-butylphenol, 2,6-di-t-butyl-4-sec-butylphenol, 2,2'-methylenebis(4-methyl-6-t-butylphenol), 2,2'-methylenebis(4-ethyl-6-t-butylphenol), 2,4-dimethyl-6-t-butylphenol, 4-hydroxymethyl-2,6-di-t-butylphenol, n-octadecyl-β(3,5 di-t-butyl-4-hydroxyphenyl)propionate, 4,4'-dihydroxydiphenol, 4,4'-thiobis(6-t-butyl-o-cresol), p-butylphenol, p-isopropylphenol, p-(1,1,3,3-tetramethylbutyl)phenol, 2,6-dioctadecyl-4-methyl phenol; 2,4,6-trimethyl phenol; 2,4,6-triisopropyl phenol; 2,4,6-tri-tert-butyl phenol; 2-tert-butyl-4,6-dimethyl phenol; 2,6-methyl-4-didodecyl phenol; octadecyl-3,5-di-tert-butyl-4-hydroxy hydrocinnamate; tetrakis[methylene (3,5-di-tert-butyl-4-hydroxy-hydrocinnamate)]methane; 2,2'-oxamido bis-[ethyl-3-(3,5-di-tert-butyl-4-hydroxyphenyl)propionate; 1,3,5-tris(4-tert-butyl-3-hydroxy-2,6-dimethylbenzyl)-s-triazine-2,4,6-(1H,3H,5H)trion e; 1,3,5-trimethyl-2,4,6-tris (3,5-di-tert-butyl-4-hydroxybenzyl)benzene; tris(3,5-di-tert-butyl-4-hydroxybenzyl) isocyanurate; thymol, mixed m- and p-cresol, p-nonylphenol, other phenols, cresols having alkyl substituents and mixtures thereof. The mixed phenolic ester stabilizer composition herein can be made up entirely of the product phenolic esters but can also contain substantial quantities of one or more other stabilizers, e.g., other phenolic stabilizers, amine-containing stabilizers, thioester stabilizers, phosphite stabilizers, etc.

Hindered Amine Costabilizer

Amine-containing stabilizers that can be used herein include the complex mixture of substituted diphenylamines containing a significant proportion of butylated and oxylated species which is obtained by reacting isobutylene and diphenylamine. Other diphenylamine, N-allyldiphenyllamine, 4-isopropoxydiphenylamine, N-phenyl-1-naphthylamine, N-phenyl-2-naphthylamine, octylated diphenylamine, for example p,p'-di-tert-octyldiphenylamine, 4-n-butylaminophenol, 4-butylaminophenol, a mixture of mono- and dialkylated tert-butyl/tertoctyldiphenylamines, a mixture of mono- and dialkylated isopropyl/isohexyldiphenylamines, mixtures of mono- and dialkylated tert-butyldiphenylamines substituted diphenylamines are commercially available. Still other amine stabilizers include the phenylenediamines and mixtures of phenolic and phenylenediamine stabilizers such as are known in the art.

Thioether/phosphite Optional Costabilizer

Examples of thioether stabilizers that can be used herein include 1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenol) disulfide, as well as commercially available Cyanox 711 (American Cyanamid), Argus DMTDP (Argus Chemical Co.) and Evanstab 14 and Carstab DMTDP (Evans). Other useful stabilizers than can be added to the mixed phenolic ester stabilizer composition of this invention include the thiophenols, dimethylacridan, phenothiazine and phosphites including but not limited to such as phenyl diisodecyl phosphite, tris(nonylphenyl)phosphite and, more recently, tris(2,4-di-t-butylphenyl)phosphite which has become the industry standard for hydrolytic stability.

Polyurethane Foams

Flexible polyurethane foams are generally prepared by reacting an organic polyisocyanate and a polyol in the presence of a blowing agent, a catalyst and optional auxiliary additives.

Polyol Component of Foams

In producing the soft, flexible foams herein, substantially any organic compound containing more than two hydroxyl groups can be used as the polyol component. Such compounds generally have molecular weights of from about 400 to about 12,000, preferably from about 1,000 to about 8,000, and most preferably from about 1,500 to about 7,000. The functionality of the hydroxyl group containing compound is generally in excess of 2 and preferably has an average functionality of from 2.5 to no more than 4. Preferred compounds include polyesters, polyesters, polythioethers, polyacetals, polycarbonates and polyester amides containing an average of more than 2, and preferably from 2.5 to 4 hydroxyl groups. When the polyisocyanate is MDI or based on MDI, the isocyanate-reactive compound advantageously has an average functionality of about 1.5 to about 3.5, more preferably about 1.8 to about 2.1. With respect to isocyanate-reactive compound, and cross-linkers and chain extenders used in this invention, the term functionality refers to the average number of groups per molecule which contain one or more active hydrogen atoms.

Polyesters containing hydroxyl groups suitable for the present invention are reacting products of polyhydric alcohols with polybasic carboxylic acids. Instead of using the free polycarboxylic acids, it is also possible to use the corresponding polycarboxylic acid esters of lower alcohols or mixtures thereof to produce the polyesters. The polycarboxylic acids may be aliphatic, cycloaliphatic, aromatic and/or heterocyclic and may optionally be substituted (for example, by halogen atoms) and/or may be unsaturated.

The polyesters suitable for use in accordance with the present invention are known to those in the art. These polyesters may be obtained by polymerizing epoxides, such as ethylene oxide, propylene oxide, butylene oxide, tetrahydrofuran, styrene oxide, or epichlorohydrin in the presence of Lewis catalysts, such as BF3. Polymerization may also be accomplished by the addition of epoxides (preferably, ethylene oxide and propylene oxide) either in admixture or successively, to compounds containing reactive hydrogen atoms such as water, ammonia, alcohols or amines. Examples of such reactive hydrogen-containing compounds are ethylene glycol, 1,3-propylene glycol, 1,2-propylene glycol, trimethylol propane, glycerol, sorbitol, 4,4'-dihydroxy diphenyl propane, aniline, ethanol amine and ethylene diamine. Sucrose polyesters and formitol or formose-started polyesters may also be used in accordance with the present invention.

Polyhydroxyl compounds containing urethane or urea groups, optionally modified natural polyols (such as castor oil), and carbohydrates (for example, starch), may also be used as the isocyanate reactive compound of the present invention. Additional products of alkylene oxides with phenol/formaldehyde resins or with urea/formaldehyde resins may also be used.

According to the present invention, it is also possible to use polyhydroxyl compounds containing high molecular weight polyadducts and polycondensates or polymers in finely dispersed or dissolved form. Such polyhydroxyl compounds may be obtained by polyaddition reactions (for example, reactions between polyisocyanates and amino functional compounds), and polycondensation reactions (for example, between formaldehyde and phenols and/or amines) in situ in the above-mentioned compounds containing hydroxyl groups. It is also possible to obtain such a polyhydroxyl compound by mixing an aqueous polymer dispersion with a polyhydroxyl compound and subsequently removing the water from the mixture.

Also suitable are the so-called polymer polyols which are prepared by polymerizing one or more ethylenically unsaturated monomers in a relatively high molecular weight organic compound containing at least two hydroxyl groups or polycarbonate polyols are also suitable for use in the process according to the present invention. Plastics having particularly low combustibility are obtained by using polyether polyols modified by graft polymerization with vinyl phosphonic acid esters and, optionally, (meth-)acrylonitrile, (meth-)acrylamide or OH-functional (meth-)acrylic acid esters. Polyhydroxyl compounds into which carboxyl groups have been introduced by radical graft to polymerization with unsaturated carboxylic acids and, optionally, other olefinically unsaturated monomers are particularly advantageous when used in combination with mineral fillers. The polymer polyols noted above and useful herein are known and are commercially available.

Isocyanate-reactive compounds generally useful in the present invention include active hydrogen containing compounds, such as, for example polyols, amine-terminated compounds, secondary amines, and amines.

Suitable polyols include, for example, polyester polyol, or a polyether polyol containing at least 50 weight percent of oxyalkylene units, an amine-terminated derivative of such polyester or polyether polyol, or a polymer polyol based on such polyester or polyether polyol. Such polyols generally process well to provide a polyurethane foam having good properties. Of these, the polyether polyols themselves, amine-terminated derivatives thereof and polymer polyols based on the polyether polyol are preferred.

Most preferred materials used as isocyanate-reactive compound herein are polymers of propylene oxide having an average functionality of about 2.0 to about 3.5 and an equivalent weight of about 900–2000 which are optionally copolymerized with about 1 to 80, preferably 10 to 30 weight percent ethylene oxide or end-capped with up to about 30, preferably up to about 20 weight percent ethylene oxide, as well as amine-terminated derivatives thereof and polymer polyols prepared therefrom, and mixtures thereof.

The amine-terminated derivatives of the polyether polyols can be prepared in the reductive amination of the polyether polyol using ammonia or a primary amine. Alternatively, the amine-terminated derivative can be prepared by deductively aminating the polyol with ammonia and then reacting the resulting primary amine with an ethylenically unsaturated compound such as acrylonitrile to form the corresponding secondary amine. Aromatic, amine-terminated polyether can be prepared by reacting the polyol with a diisocyanate, followed by hydrolyzing the free isocyanate groups to amine groups. Alternatively, the polyol can be reacted with a material such as o- or p-chloronitrobenzene to form an ether, followed by reduction of the nitro groups to corresponding amine groups.

Several types of polymer polyols based on polyether or polyester polyols are useful as isocyanate-reactive compound in this invention. In this invention, a polymer polyol refers to a dispersion of a polymer in a continuous polyol phase. The dispersed polymer can be a polymer of one or more ethylenically unsaturated monomers, an epoxy resin, a polyurethane or a polyurea. Of these, dispersions of styrene and/or acrylonitrile polymer and copolymers, polyurea dispersions (the so-called ("PHD polyols") and polyurea-polyurethane dispersions (the so-called PIPA polyols) are preferred.

Isocyanate Component of Foams

Substantially any organic polyisocyanate may be used in producing the flexible foams of the present invention. Aliphatic, cycloaliphatic, araliphatic, aromatic and heterocyclic polyisocyanates may be used. Among the polyisocyanates described herein are those corresponding to the general formula:

wherein n represents 2–4, preferably 2; and

Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms; or an araliphatic hydrocarbon radical containing from 8 to 1 5 (preferably from 8 to 13) carbon atoms.

Examples of compounds corresponding to this formula are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanato-methyl cyclohexane; 2,4- and 2,6-hexahydrotolylene diisocyanate and mixtures of these isomers; hexahydro-1,3- and/or 1,4-phenylene diisocyanate; perhydro 2,4'- and/or 4,4'-dipheynl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

Other examples of suitable polyisocyanates are; triphenyl methane-4,4',4"-triisocyanate, polyphenyl polymethylene polyisocyanates of the type obtained by condensing aniline with formaldehyde followed by phosgenation ; (m-) and p-isocyanato phenyl sulfonyl isocyanates; polyisocyanates containing carbodiimide groups; norbornane diisocyanates; polyisocyanates containing allophanate groups; polyisocyanates containing isocyanurate groups; polyisocyanates containing urethane groups; polyisocyanates containing acylated urea groups; polyisocyanates containing biuret groups; polyisocyanates produced by telomerization reactions; polyisocyanates containing ester groups; reaction products of the above-mentioned diisocyanates with acetals and polyisocyanates containing polymeric fatty acid esters. It is also possible to use the isocyanate group-containing distillation residues obtained in the commercial production of isocyanates, optionally in solution in one or more of the above-mentioned polyisocyanates. It is also possible to use mixtures of the above-mentioned polyisocyanates.

It is generally preferred that the commercially available polyisocyanates be used in the present invention. Such readily available materials include 2,4- and 2,6-tolylene diisocyanate, also mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups; urethane groups; allophanate groups, isocyanurate groups, urea groups or biuret groups ("modified polyisocyanates").

Preferred polyisocyanates for use in accordance with the invention include tolylene diisocyanate in the form of an 80:20 mixture of the 2,4- and 2,6-isomers ("TDI 80"), tolylene diisocyanate in the form of 65:35 mixture of the 2,4- and 2,6-isomers ("TDI 65"), and tolylene diisocyanate prepolymers.

Blowing Agents

Suitable blowing agents include water, optionally, with additional readily volatile inorganic or organic substances in an amount of 0.1 to 25 parts by weight to 100 parts by weight of polyol. Appropriate additional organic blowing agents are acetone, ethyl acetate, halogen-substituted alkanes, such as methylene chloride, chloroform, ethylidene chloride, vinylidene chloride, monofluorotrichloromethane; chlorodifluoromethane, dichlorodifluoromethane; cyclopentane, fluorinated hydrocarbons, butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g. nitrogen, given off by azo compounds, such as azodicarbonamide or azobutyronitrile). Another definition of blowing agents is any material which is capable of generating a gas under the conditions of the reaction of a polyisocyanate and a isocyanate-reactive compound. Such materials include air, carbon dioxide, nitrogen, water, formic acid, low-boiling halogenated alkanes, finely divided solids, the so-called "azo" blowing agents such as azo-bis(formamide) and the like. Preferred are water, the low-boiling halogenated alkanes, or mixtures thereof. Blowing agents are advantageously employed in a quantity sufficient to provide the foam with a bulk density from about 0.5, preferably about 0.9, more preferably about 1.0 to about 6 or less, preferably about 4, more preferably about 3 pounds per cubic foot. The halogenated alkanes, including methylene chloride, dichlorodifluoromethane, mono chlorodifluoromethane, monochlorotrifluoromethane and the like, generally provide the desired density when employed in amounts from about 5 to about 50 parts per 100 parts isocyanate reactive compound. Lesser amounts are useful when employed in conjunction with another blowing agent, such as water.

Catalyst and Crosslinkers

A catalyst for the reaction of the isocyanate-reactive compound and the polyisocyanate is also advantageously used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, -methyl morpholine, -ethyl morpholine, diethyl ethanol amine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the isocyanate-reactive compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Advantageously, about 0.001 to about 0.5 part by weight of an organometallic catalyst is used per 100 parts of the isocyanate-reactive compound.

Cross-linkers may be used, particularly in high resiliency slabstock foam in order to improve load-bearing and processing. Suitable such cross-linkers include alkanolamines and other compounds of about 200 or lower equivalent weight having about 3–8, preferably about 3–4, active hydrogen-containing groups per molecule. Exemplary such compounds are glycerine and trimethylol propane, as well as other alkylene triols. Preferred, however, are alkanolamines such as diethanolamine, triisopropanolamine, triethanolamine, diisopropanolamine, adducts of 4–8 moles of ethylene oxide and/or propylene oxide with ethylene diamine and the like, ammonia and the like. Most preferred, on the basis of its optimum reactivity, is diethanolamine. When used, about 0.1 to about 4 parts of the cross-linker are advantageously employed per 100 parts of isocyanate-reactive compound.

Chain extenders may also be used to further improve the load-bearing of the foam. "Chain extenders," for the purpose of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dupropylene glycol, tripropylene glycol, 1,4-cyclohexanedimethanol and the like. Amine chain extenders include diethyl toluene diamine, phenylene diamine, methylene bis(o-chloroaniline), NaCl-blocked methylene bis (aniline), toluene diamine, aromatic di amines which are substituted for at least one of the carbon atoms adjacent to the amine groups with a lower alkyl group, and the like. Such chain extenders, when used, are advantageously employed in a minor amount, i.e., from about 2 to about 30 parts per 100 parts isocyanate-reactive compound. It is usually preferable, however, to prepare the foam in the substantial absence of a chain extender.

EXAMPLES

The following examples are illustrative of the invention.

Laboratory investigation of antioxidants for flexible polyurethane foam is done primarily by adding the antioxidants into a minimally stabilized flexible slabstock polyether polyol and making handmix box samples of flexible polyurethane foam. The primary threat to thermal degradation of flexible polyurethane foam takes place in the center of the large blocks during the manufacturing process. The core block temperature continues to increase within the first four hours of manufacture. This temperature build-up is not seen in small foam blocks because the insulating effect of the foam mass is not sufficient. The temperature effect is simulated by placing a newly made handmix bun in a microwave oven. Heat exposure is often prolonged by placing the hot foam in a convection oven. Careful selection of the microwave and convection oven conditions for exposing the newly made foam blocks is effective in predicting the relative performance of different polyurethane polyol antioxidant packages in the large scale foam manufacturing equipment.

Antioxidants Evaluated

The comparative data given in the examples reference the following antioxidants:

P-1: Butylated Hydroxytoluene (BHT); a relatively low molecular weight, highly volatile antioxidant.

P-2: 3,5-di-t-butyl-4-hydroxy-hydrocinnamic acid, $C_7$–$C_9$ branched alkyl ester This is a liquid phenolic of intermediate molecular weight. It is substantially less volatile than BHT.

P-3: octadecyl 3,5-di-t-butyl-4-hydroxyhydrocinnamate This is a high molecular weight di-tertiary butyl phenol with a long aliphatic chain to reduce volatility.

A-1: octylated, butylated diphenylamine. This is a liquid hindered aromatic amine.

MBPP: methyl 3-(4-hydroxy-3,5-di-tert-butylphenyl) propionate; the composition of this invention. This is a high performance solid phenolic of lower volatility than BHT Polyol Sample Preparation Minimally stabilized polyol containing traces of butylated hydroxytoluene (BHT) is used as the basis for stabilizer evaluation. The antioxidants to be evaluated are added from concentrated solutions in this polyol. All solutions are identically prepared, with heating and stirring under nitrogen.

Foam Sample Preparation & Evaluation

The following ingredients are mixed together and poured into an 8"×8"×4" cake box:

| Components | Weight (grams) |
| --- | --- |
| 3000 mw polyether triol | 150.0 |
| Water | 7.5 |
| Niax L-620[1] silicone surfactant | 2.0 |
| DABCO 33LV[2] amine catalyst | 0.5 |
| DABCO T-9[2] tin catalyst | 0.4 |
| Toluene Diisocyanate (80/20) | 110 Index |

[1]OSi Specialties, Inc.
[2]Air Products and Chemicals, Inc.

A 900 watt microwave oven is used to thermally stress these handmix foams. A current and voltage power conditioner is used to insure the AC power going to the microwave oven does not fluctuate over time. The oven is pre-conditioned at the start of a foaming series by placing 500 milliliters of tap water in the center of the oven and heating it for 10 minutes at 30% power. This also serves as a calibration step in the procedure. This volume of water increases 60° C. in temperature after the microwave oven exposure. The calibration makes certain that the oven output remains standard from one experiment to the next.

Rise and gel times are recorded for each foam. This is an additional check on the consistency of the procedure. After the foam has completely risen, it cures in the fume hood for a carefully timed 5 minutes. After 3 minutes of this time period, the sides of the box are peeled off to leave only the bottom intact. The foam is then placed in a calibrated microwave oven for 5 minutes and 10 seconds at 30% power on this particular oven. The first foam of the day is discarded because the non-equilibrated microwave oven will not give data compatible with the remainder of a series. The thermally exposed foam is removed from the microwave oven and placed in a 120° C. convection oven for 5 minutes. Finally, the foam is removed to a hood and allowed to cool. For all foams made after the first discarded foam and immediately after obtaining the foam's rise time, 500 milliliters of cool tap water is placed in the center of the microwave oven and heated for 5 minutes at 30% power. This 5 minute period coincides with the cure time for the foam just poured and waiting to go into the microwave oven. This entire handmix foam procedure is repeated for every foam in the series.

As a final check on bun to bun consistency in the foaming and curing procedure, air flows are measured for each bun made. Variability of ±1 cubic foot per minute of air flow is deemed acceptable. The average air flow for foams is 6 cfm. Each foam is cut into ¼" slices to determine the area of darkest color. For a properly operating microwave oven and properly prepared foams, this location should be identical for each foam, and ideally at the center of the foam bun. The color developed during thermal exposure is compared to a white standard on a Hunter spectrophotometer. The color analysis chosen is the Delta E index. Delta E is a measurement that relates to how the human eye perceives color. Three aspects of color are measured: lightness-darkness (L), redness-greenness (a), and yellowness-blueness (b). Delta E then becomes a mathematical expression calculating the difference in each of these aspects between the sample and the standard:

$$\Delta E = \sqrt{\Delta L^2 + \Delta a^2 + \Delta b^2}$$

A one (1) unit change in the Delta E value is a statistically significant difference.

Heat exposure conditions for this study were more severe than would be found in an actual foam production line. Core temperature of a handmix bun immediately after microwave exposure is approximately 190° C. These conditions were chosen to provide a sufficient spread in the color data so as to aid in antioxidant package discrimination, and assist in obtaining the most efficient ratio of the various antioxidants. The polyol manufacturers then can reduce the total concentration to meet their needs. There were nine designed experiments totally 166 individual foams in the studies reported herein.

Experimental Design

There are a large number of factors which influence the results of a program to optimize antioxidant package for polyether polyols. Among these are: operator inconsistency, variability among minimally stabilized polyol lots, and temperature and humidity variations during a series being foamed. There may also be unforeseen interactions among the antioxidants being screened. Furthermore, the sheer number of permutations necessary to evaluate a number of antioxidants in their various combinations are practically insurmountable.

A solution to this problem is to use statistical techniques to provide prediction of the variables of interest. A statistical software package is used to generate experimental designs so as to minimize the number of foams required to make a reasonable estimation of the most promising packages. Designed experiments maximize information while minimizing the experimental effort required to determine valid conclusions. The statistical design method allows the altering of one, two, or more variables from one experiment to the next, and gives good estimates of the effects of variables from far fewer experiments. The bonus is that the magnitude of the interactions, if any, are measured. This was the technique used in the studies reported here.

The variables in these statistically designed experiments are the antioxidant type and concentration. Statistical software packages fit the data to a linear model, or a quadratic polynomial model. A standard analysis of variance (ANOVA) tells if the fit is statistically significant. In many cases a linear model worked fine to predict the results. Some of the antioxidant packages do carry along second-order terms to improve the fit. The simpler the model, the better. The experimental designs were chosen so as to permit prediction over a limited region of antioxidant concentrations. A statistical estimate of linear effects and interaction among the antioxidants at varying concentrations are predicted in this work.

A useful statistical quantity to evaluate the predictability of a model is the value of $R^2$. This quantity, known as the "coefficient of determination", indicates what percentage of the variation present in the data is accounted for by the model. How much of the variation in the data can be explained by the model. $R^2$ ranges from 0 to 1, and generally the closer to 1, the better the model explains the data. The $R^2$ values for all of these experimental designs is between 0.81 and 0.97.

Analysis of the statistically predicted results are visually available to the experimenter as two-dimensional contour plots and three-dimensional plots of the variables against Delta E. Examination of these contour graphs permits both the assessment of the best performing package in color reduction, and the relative concentration required of each antioxidant package to reach a desired Delta E. It is important to note that these Delta E predictions are based on laboratory stressed foams and are therefore useful for relative performance predictions. These are not the absolute Delta E values one would obtain on a foam line. One can assess the performance of a specific antioxidant package with which one has foam line experience, by finding that package on the contour plot. From this, one can determine what could make a better or more cost effective antioxidant package. Recall, also, these results are specific to the foam formulation chosen for microwave scorching.

Results

The data from nine statistically designed experiments are used in this study, totaling 166 foams. The designs were both two and three variable evaluations (e.g., two component antioxidant packages or three component antioxidant packages). Each of these models yields contour plots of Delta E over a range of antioxidant concentrations. Where one amine and one phenolic are evaluated, the concentration range of each is 1000–4000 ppm. When a third component is evaluated for its significance in the antioxidant package, it is generally evaluated at 100–1500 ppm. Analysis of data can be examined in two ways. Results from each of the individual designed experiments can be examined independently of one another and conclusions drawn. Another technique valid with consistent, reproducible microwave scorch results is to evaluate Delta E data across all the designed experiments. Both of these approaches are used herein.

I. Two Component Antioxidant Packages: One Amine+One Phenolic

Figure 1:
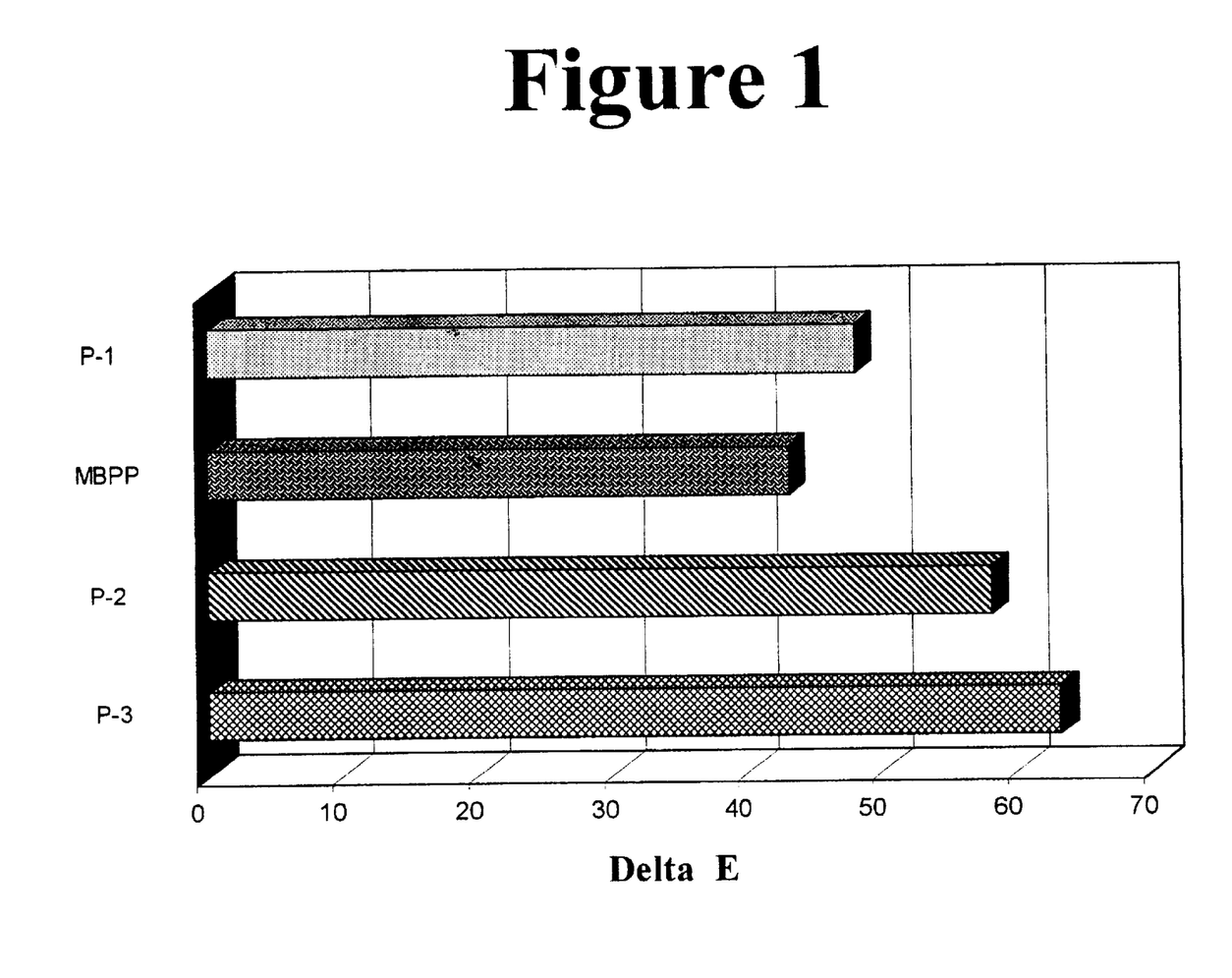
FIG. 1 illustrates a graph of experimental results for blends of amine and phenolic stabilizers showing lower Delta E color for MBPP of the invention.
Figure 2:
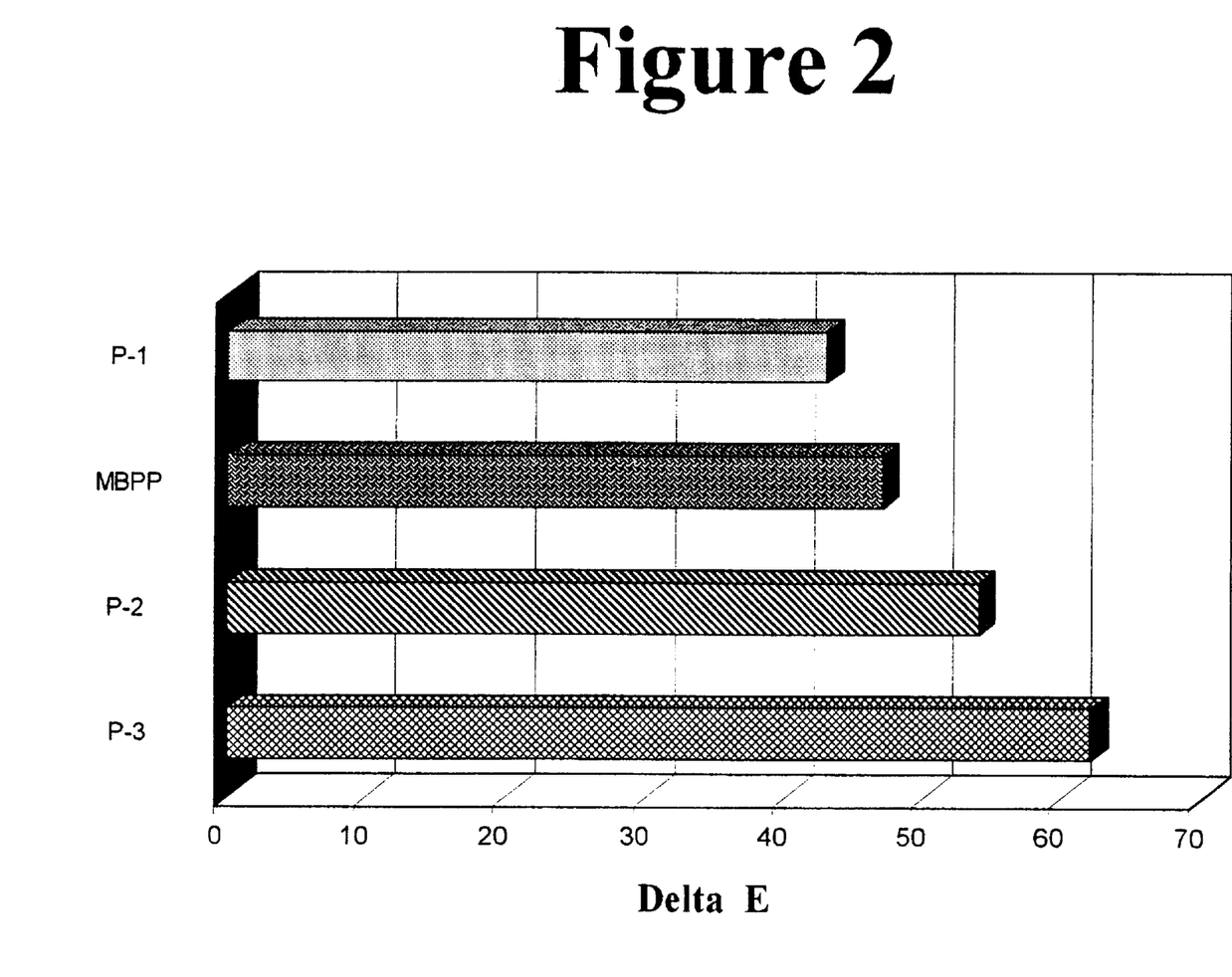
FIG. 2 illustrates a graph of experimental results for blends of amine and phenolic stabilizers showing lower Delta E color for MBPP of the invention.
Figure 3:
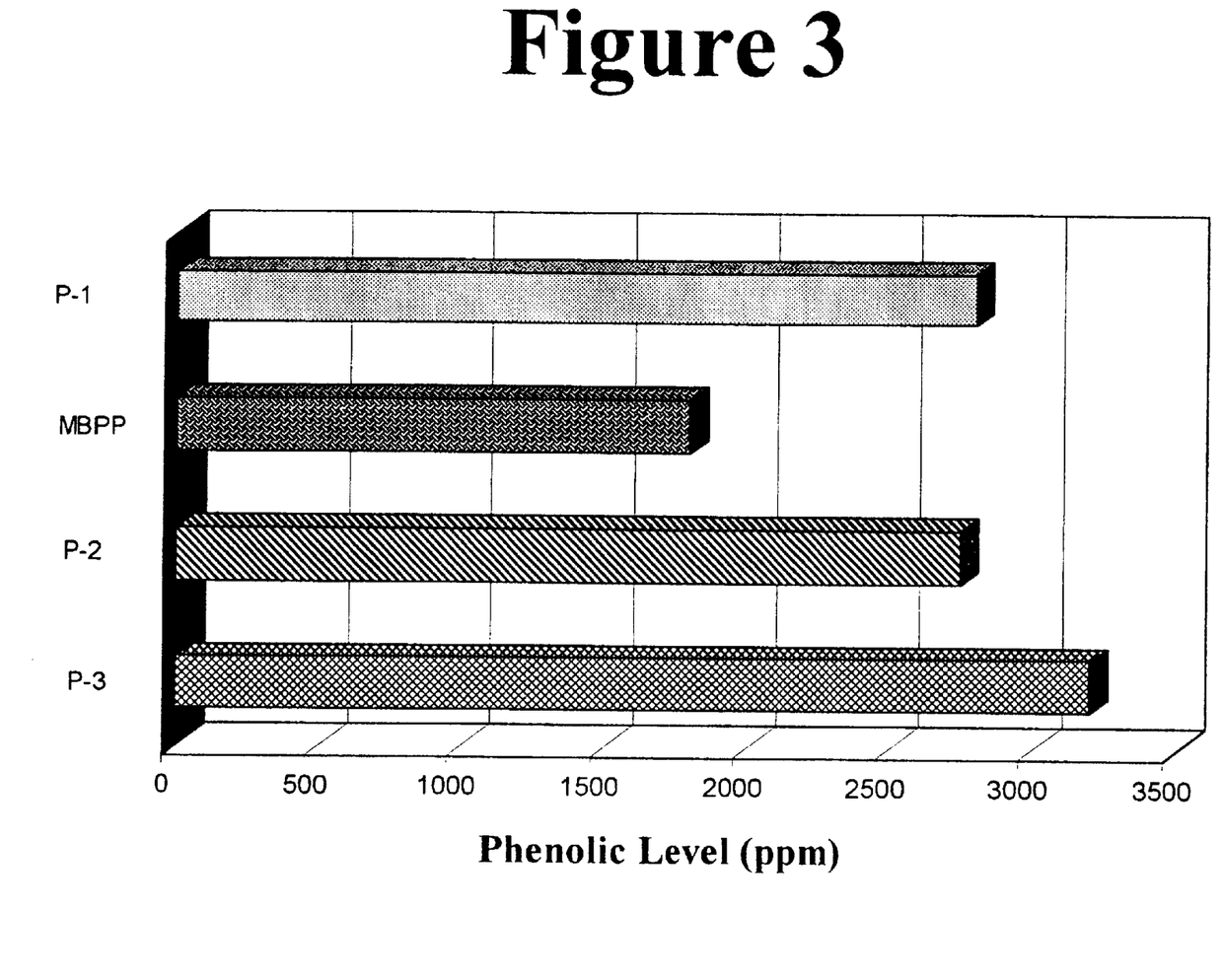
FIG. 3 illustrates a graph of experimental results for blends of amine and phenolic stabilizers showing lower Delta E color for MBPP of the invention.

The ability to interpret among multiple contour graphs presents a new way to get a good comparative evaluation. In finding a suitable replacement package for BHT (P-1), it is initially necessary to determine the effectiveness of the replacement candidates at the same concentration of all candidates. FIG. 1 shows the efficiency of the hindered amine A-1 at a concentration of 4000 ppm together with a phenolic concentration of 1000 ppm. It is noteworthy in showing MBPP to be equal or better than P-1. The much higher molecular weight phenolics are less effective. Generally, higher molecular weights are less efficient because they have a lower molar concentration of active phenolic hydroxyls. FIG. 2 is a similar plot, in which the concentrations were adjusted to 3000 ppm of A-1 and 2000 ppm of each respective phenolic. Here the reduced amine level causes P-1 to be best, but MBPP is close behind, with the others again less effective. When the amount of A-1 is examined at the 3500 ppm level, the MBPP again is more effective than P-1. In FIG. 3 an intermediate A-1 concentration of 3500 ppm is used, and the phenolic concentration was determined from the contour plots to yield identical Delta E's of 45. A Delta E of 45 was selected as a point of comparison because it was attainable in all of the experiments. MBPP performs better at this A-1 amine level than BHT. One may speculate that the higher phenolic content of MBPP over the higher molecular weight phenolics may have combined with a lower volatility in this very harsh scorched foam evaluation to give this good result.

This speculation is made more logical by examination of Table 1. This table illustrates the relative volatility of the examined antioxidants by analyzing them on a Thermal Gravimetric Analyzer (TGA). One evaluation method is to program the instrument to ramp up the temperature at a rate of 10° C. per minute and determine the weight loss vs. temperature. P-1 loses half of its weight by 182° C. The other antioxidants have significantly less volatility. Another method to evaluate volatility by TGA is to determine isothermal weight loss. Here, each sample was held at 160° C. in a nitrogen atmosphere for 250 minutes. This temperature is representative of a commercial production foam bun's core temperature. Time to 20% and 50% weight loss are given in Table I.

II. Three Component Antioxidant Packages

This section examines the effect on components A and B when component C is at specific levels in a three component designed experiment. This was done by computer generated isobar graphs of Delta E from the statistical data and plotting the change in Delta E at four different concentrations of the variable third component. (Note: These graphs could be generated at any concentration of the third component, within the concentration range studied.

This example evaluated MBPP as a third component in a designed experiment. The effectiveness of the third component's interaction was determined by the following: P-3 was held constant, and three levels of A-1 and three levels of MBPP were chosen to investigate its range of effectiveness in improving the total antioxidant package. In this design, MBPP was evaluated up to 1500 ppm.

Figure 4:
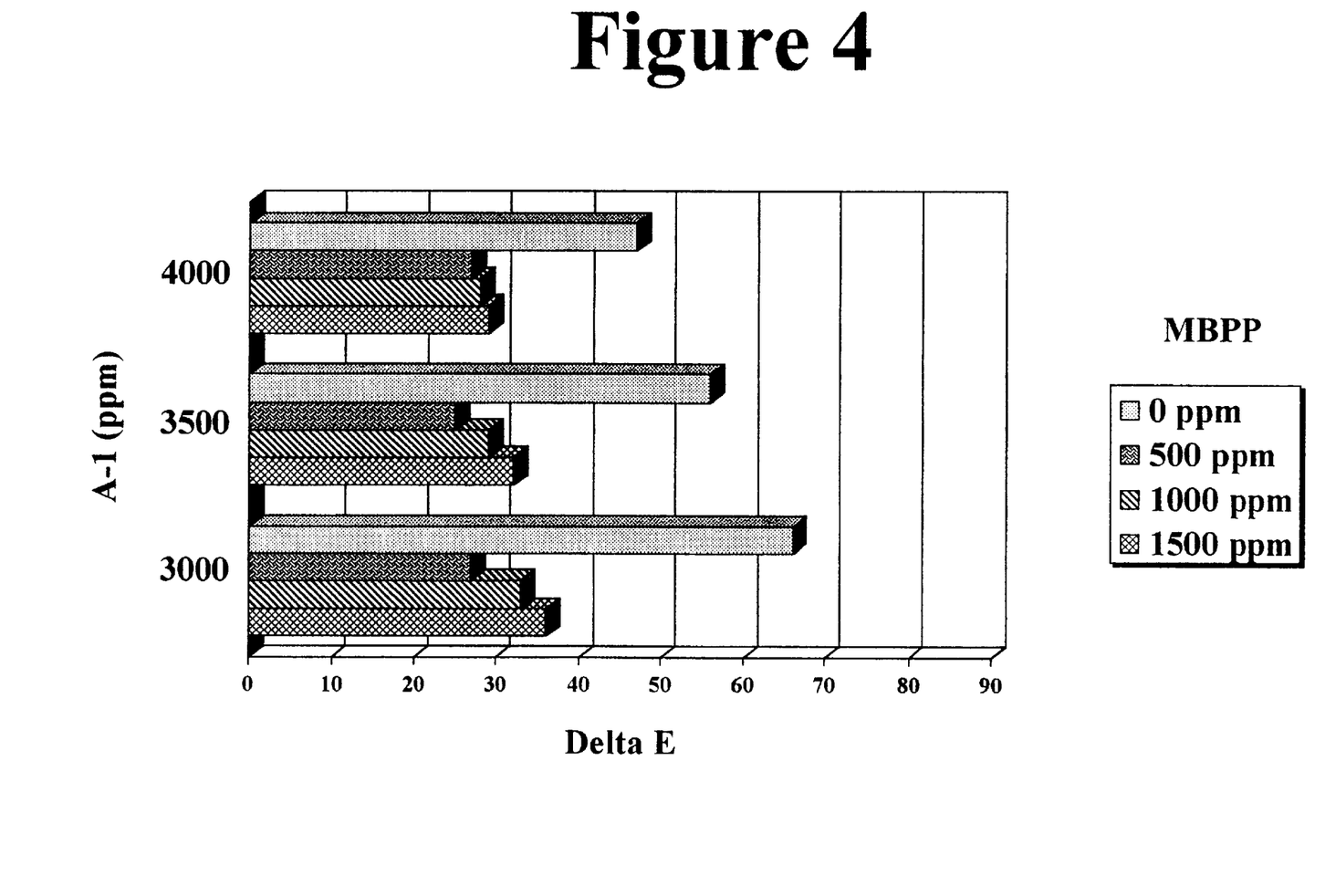
FIG. 4 illustrates a graph of experimental results for blends of amine and phenolic stabilizers showing lower Delta E color for MBPP of the invention.

Microwave induced discoloration at three levels of A-1 with 1500 ppm P-1 was determined when this antioxidant package was fortified with three levels of MBPP. The results are shown in FIG. 4. MBPP is beneficial with high concentrations of A-1 and lower concentrations (i.e., 1500 ppm) of P-3 in the range of 500 ppm RB-515. An expanded design could be performed to evaluate the effect of MBPP when holding P-3 constant at 1500 ppm.

Figure 5:
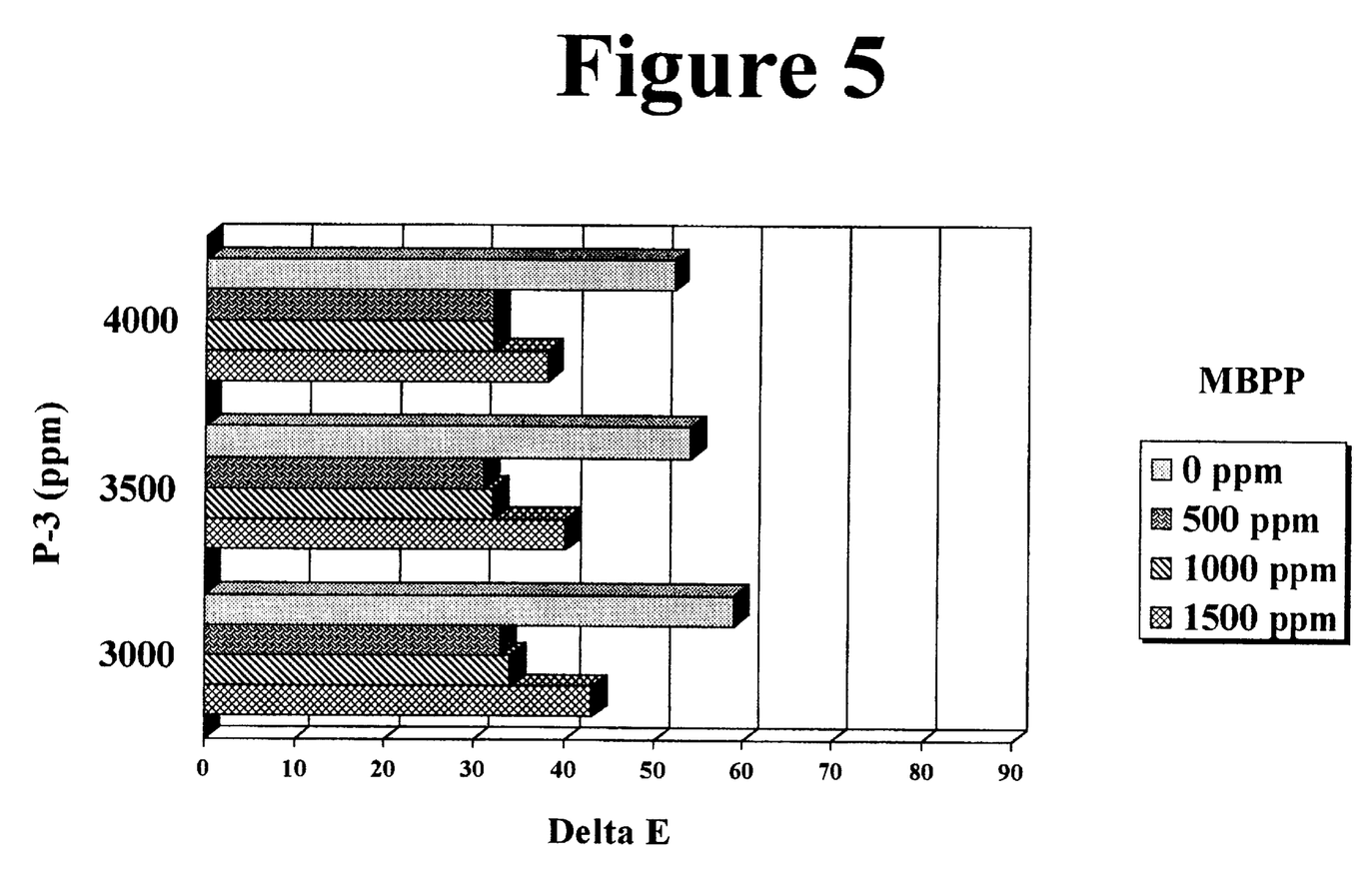
FIG. 5 illustrates a graph of experimental results for blends of amine and phenolic stabilizers showing lower Delta E color for MBPP of the invention.

The 2D contour graphs were again examined to determine if there was additional benefit to be found by switching to high P-3 with only 1500 ppm A-1 (see FIG. 5). Analysis of these data points clearly shows that MBPP is beneficial, again shows the optimal level of MBPP to be around 500 ppm.

Examination of the graphs above shows that proper formulation development by the use of designed experiments can significantly aid in developing an antioxidant package for polyols that will give good results at a minimum cost. Interactions and synergist effects are elucidated in designed experiments, if present. Here we see the regions within which a third component can add to the overall performance, clearly demonstrating the value of MBPP as an amplifier of polyol antioxidant performance.

TABLE 1

| AO | Temp. (° C.) to 50% Weight Loss | % Volatility @ 182° C. | Time to Respective Wt. Loss @ 160° C. Isothermal (min) 20% | 50% |
|---|---|---|---|---|
| P-1 | 182 | 50 | 2 | 5 |
| MBPP | 227 | 6 | 20 | 52 |
| A-1 | 238 | 8 | 21 | 87 |
| P-2 | 269 | 2 | 49 | 169 |
| P-3 | 337 | <1 | 250+ | 250+ |

What is claimed is:

1. An isocyanate-reactive composition comprising an isocyanate-reactive compound having an equivalent weight of from about 400 to about 12000, and a stabilizing amount of methyl 3-(4-hydroxy-3,5-di-tert-butylphenyl)propionate.

2. The composition of claim 1 wherein the isocyanate-reactive compound has an equivalent weight of from about 1,000 to about 2,500.

3. The composition of claim 2 wherein the isocyanate-reactive compound is a polyester or polyether polyol.

4. The composition of claim 1 wherein the methyl 3-(4-hydroxy-3,5-di-tert-butylphenyl)propionate is present in amounts from 0.01 to 5.0 percent by weight of isocyanate-reactive compound.

5. The composition of claim 1 wherein the methyl 3-(4-hydroxy-3,5-di-tert-butylphenyl)propionate is blended with 0.01 to 5.0 percent by weight of one or more costabilizers selected from the group consisting of hindered phenols, hindered amines, lactones, thioethers and phosphites.

6. The composition of claim 5 wherein said costabilizer is selected from the group consisting of hydroxyphenyl) propionate, ethyl 3-(3,5-di-t-butyl-4-hydroxyphenyl) propionate and propyl 3-(3,5-di-t-butyl-4-hydroxyphenyl) propionate.

7. The composition of claim 5 wherein said costabilizer is an hindered amine selected from the group consisting of diphenylamine, p,p'-di-tert-octyldiphenylamine, p,p'-di-a-phenylethyldiphenylamine, p-tert-octyl-p'-phenylethyl-diphenylamine, p-tert-octyldiphenylamine, p-phenylethyldiphenylamine, tri-t-octyldiphenylamine, p-tert-butyldiphenylamine, p,p'-di-tert-butyldiphenylamine, p-tert-octyl-p'-butyldiphenylamine, p-tert-butyl-p'-phenylethyldiphenylamine, phenyl-beta-diphenylamine, the ditolylamines, the phenyltolylamines, the dinaphthylamines, dianilinodiphenyl-methane, p-hydroxyldiphenylamine, p-amino-diphenylamine, N,N'-diphenyl-p-phenylenediamine, p-chlorodiphenylamine, p-isopropoxydiphenylamine and mixtures thereof.

8. The composition of claim 5 wherein said costabilizer is a hindered phenol selected from the group consisting of 2,4-dimethyl-6-octylphenol, 2,6-di-t-butyl-4-methylphenol, 2,6-di-t-butyl-4-nonylphenol, 2,6-di-t-butyl-4-n-butylphenol, 2,6-di-t-butyl-4-ethylphenol, 2,6-di-t-butyl-4-sec-butylphenol, 2,2'-methylenebis(4-methyl-6-t-butylphenol), 2,2'-methylenebis(4-ethyl-6-t-butylphenol), 2,4-dimethyl-6-t-butylphenol, 4-hydroxymethyl-2,6-di-t-butylphenol, n-octadecyl-b(3,5 di-t-butyl-4-hydroxyphenyl) propionate, 4,4'-dihydroxydiphenol, 4,4'-thiobis(6-t-butyl-o-cresol), p-butylphenol, p-isopropylphenol, p-(1,1,3,3-tetramethylbutyl)phenol, thymol, mixed m- and p-cresol, p-nonylphenol and mixtures thereof.

9. A process for preparing a flexible polyurethane foam comprising reacting together an organic polyisocyanate with an isocyanate-reactive composition, wherein one of the reactants has mixed therewith a stabilizing amount of methyl 3-(4-hydroxy-3,5-di-tert-butylphenyl)propionate, in the presence of a blowing agent and under conditions sufficient to form the polyurethane foam.

10. The process of claim 9 wherein the isocyanate-reactive compound has an equivalent weight of from about 1,000 to about 2,500.

11. The process of claim 9 wherein the isocyanate-reactive compound is a polyether or polyester polyol.

12. The process of claim 9 wherein the methyl 3-(4-hydroxy-3,5-di-tert-butylphenyl)propionate is present in amounts from 0.01 to 5.0 percent by weight of isocyanate-reactive compound.

13. The process of claim 9 wherein the methyl 3-(4-hydroxy-3,5-di-tert-butylphenyl)propionate is blended with 0.01 to 5.0 percent by weight of one or more costabilizers selected from the group consisting of hindered phenols, hindered amines, lactones, thioethers and phosphites.

14. The process of claim 9 wherein the blowing agent is water.

* * * * *

UNITED STATES PATENT AND TRADEMARK OFFICE
CERTIFICATE OF CORRECTION

PATENT NO.    : 6,348,514 B1                                           Page 1 of 1
DATED         : February 19, 2002
INVENTOR(S)   : R. A. Calabrese et al.

It is certified that error appears in the above-identified patent and that said Letters Patent is hereby corrected as shown below:

<u>Title page</u>,
Item [75], Inventors, please delete "Guildford" and insert -- Guilford -- in its place.

Signed and Sealed this

Eleventh Day of June, 2002

Attest:

Attesting Officer

JAMES E. ROGAN
*Director of the United States Patent and Trademark Office*